United States Patent [19]

Kunde

[11] Patent Number: 5,459,244
[45] Date of Patent: Oct. 17, 1995

[54] POLYFUNCTIONAL AZO REACTIVE DYESTUFFS CONTAINING A MORPHOLINYL-SUBSTITUTED FLUOROTRIAZINE RADICAL

[75] Inventor: Klaus Kunde, Neunkirchen, Germany

[73] Assignee: Bayer Aktiengesellschaft, Leverkusen, Germany

[21] Appl. No.: 314,552

[22] Filed: Sep. 28, 1994

[30] Foreign Application Priority Data

Oct. 4, 1993 [DE] Germany ............... 43 33 777.5

[51] Int. Cl.⁶ ............... C09B 62/008; D06P 1/38
[52] U.S. Cl. ............... 534/634; 534/632; 8/549
[58] Field of Search ............... 534/634

[56] References Cited

U.S. PATENT DOCUMENTS

| | | | |
|---|---|---|---|
| 4,447,357 | 5/1984 | Holzle et al. | 534/634 |
| 4,631,065 | 12/1986 | Seitz et al. | 534/634 X |
| 4,748,236 | 5/1988 | Jager et al. | 534/634 |
| 4,818,247 | 4/1989 | Tzikas et al. | 534/634 X |
| 4,988,803 | 1/1991 | Stöhr et al. | 534/635 X |
| 5,298,607 | 2/1995 | Seiler | 534/638 |
| 5,378,817 | 1/1995 | Bootz et al. | 534/618 |

FOREIGN PATENT DOCUMENTS

| | | | |
|---|---|---|---|
| 087113 | 8/1983 | European Pat. Off. | |
| 3502104 | 7/1986 | Germany | 534/634 |
| 63-175075 | 7/1988 | Japan | 534/634 |
| 2026527 | 2/1980 | United Kingdom. | |

OTHER PUBLICATIONS

Chemical Abstracts 85:937967, abstract of JP 73–31,566 (Oct. 13, 1975).

Primary Examiner—Johann Richter
Assistant Examiner—Fiona Powers
Attorney, Agent, or Firm—Sprung Horn Kramer & Woods

[57] ABSTRACT

Novel polyfunctional azo reactive dyestuffs of the formula (I)

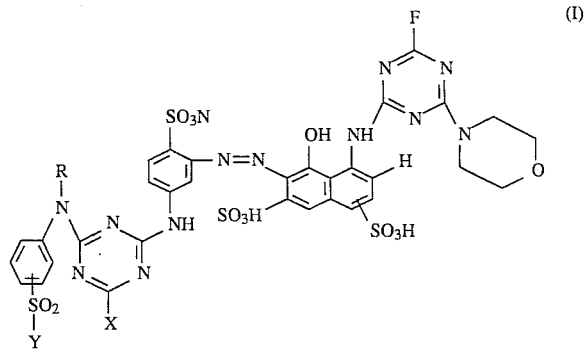

in which

Y denotes $CH_2CH_2OSO_3H$, $CH_2CH_2Cl$, $CH_2CH_2OH$ or $CH=CH_2$,

X denotes F, Cl or $OCH_3$, and

R denotes hydrogen or $C_1$–$C_4$-alkyl, have been found, and a process for their preparation and their use for dyeing and printing hydroxyl- and amido-containing materials in hues having improved fastness properties are described.

10 Claims, No Drawings

POLYFUNCTIONAL AZO REACTIVE DYESTUFFS CONTAINING A MORPHOLINYL-SUBSTITUTED FLUOROTRIAZINE RADICAL

The invention relates to novel trifunctional reactive dyestuffs, a process for their preparation and their use.

The object of the present invention is to provide reactive dyestuffs having improved fastness properties.

The invention relates to reactive dyestuffs of the general formula (I)

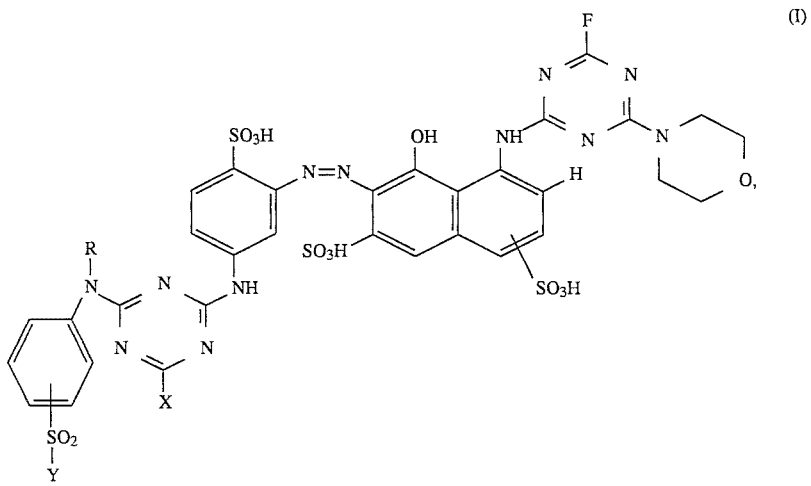

in which
X represents F, Cl or OCH$_3$, and
Y represents CH$_2$CH$_2$OSO$_3$H, CH$_2$CH$_2$Cl, CH$_2$CH$_2$OH or CH=CH$_2$ and
R denotes hydrogen or C$_1$–C$_4$-alkyl.
Preference is given to dyestuffs of the formula (II)

in which
X and R have the above meanings.

A particularly preferred embodiment are dyestuffs of the formula (II) in which X represents chlorine and Y represents CH$_2$CH$_2$OSO$_3$H or CH=CH$_2$.

Particular preference is further given to dyestuffs of the formula (I) in which R represents hydrogen or methyl and X has the abovementioned meaning.

Particular preference is also given to dyestuffs of the formula (III)

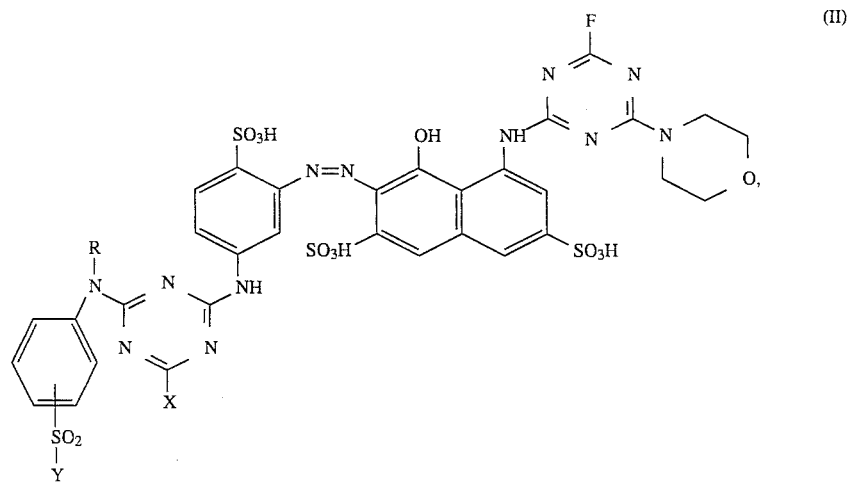

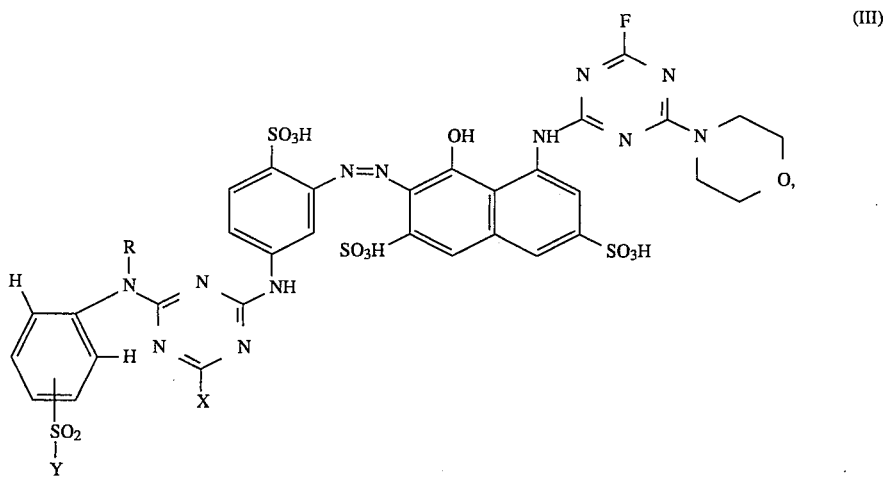

in which
Y is $CH_2CH_2OSO_3H$ or $CH=CH_2$, and
R and X have the above meanings.

Very particular preference is given to the two dyestuffs of the formula (IV) or mixtures of the two

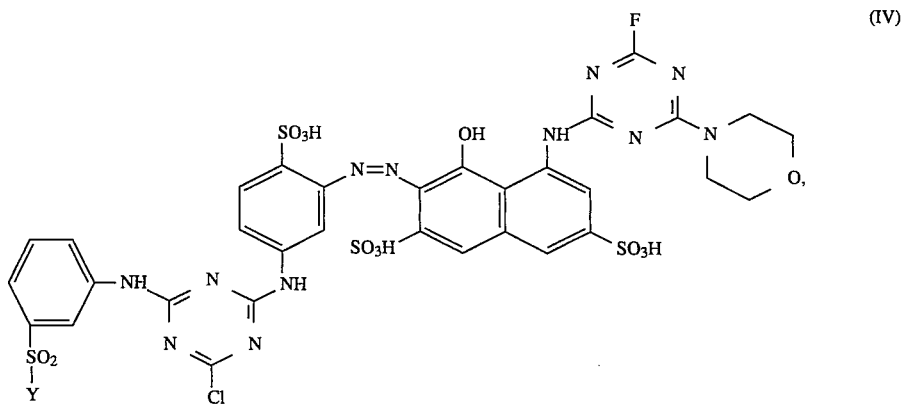

in which
Y is $CH_2CH_2OSO_3H$ or $CH=CH_2$.

The invention also provides a process for preparing the dyestuffs of the formula (I) according to the invention, which is characterized in that the amino compound of the general formula (V)

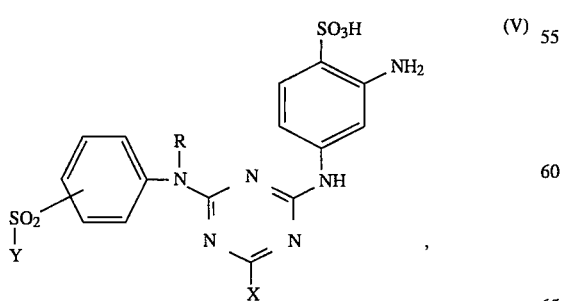

in which
Y, R and X have the abovementioned meanings, is diazotized, and the resulting diazonium compounds are reacted with the coupling component of the general formula (VI)

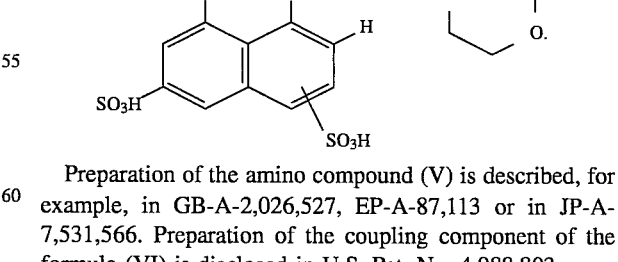

Preparation of the amino compound (V) is described, for example, in GB-A-2,026,527, EP-A-87,113 or in JP-A-7,531,566. Preparation of the coupling component of the formula (VI) is disclosed in U.S. Pat. No. 4,988,803.

Amino compounds of the formula (V) which are preferably used in the process for preparing the dyestuffs of the formula (I) according to the invention are those in which X represents Cl, represents $CH_2CH_2OSO_3H$ or $CH=CH_2$ and R has the abovementioned meaning. Preference is also given to amino compounds of the formula (V) in which R represents hydrogen or methyl, and X represents F, Cl or $OCH_3$, and Y represents $CH_2CH_2OSO_3H$ or $CH=CH_2$, and to amino compounds of the formula (Va)

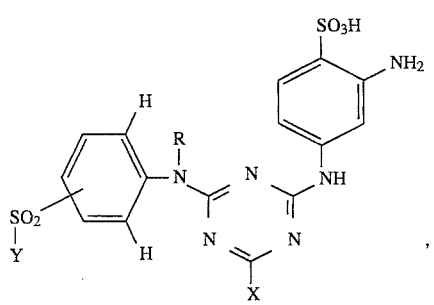

(Va)

in which

X, Y and R have the abovementioned meaning, in particular to amino compounds of the formula (Vb)

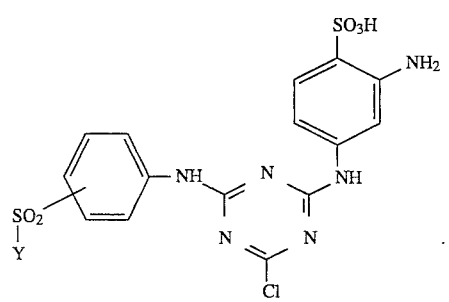

(Vb)

The coupling component Preferably used in the process has the formula (VIa)

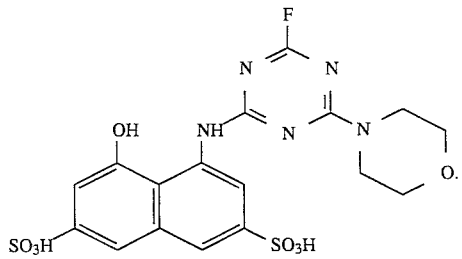

(VIa)

The reactive dyestuffs of the formula (I) are suitable for dyeing and printing natural and synthetic hydroxyl- or amido-containing materials, such as silk, wool, synthetic polyamide fibres, cellulose-containing materials or leather, but in particular cellulose-containing materials of fibrous structure, such as linen, cellulose itself, regenerated cellulose and especially cotton, in red hues having improved fastness properties. They are suitable not only for the exhaust method but also for dyeing by the customary pad-dyeing method, whereby the material is impregnated with aqueous dyestuff solutions which, if desired, may also contain salt, and the dyestuffs are fixed, after an alkali treatment or in the presence of alkali, if appropriate with the application of heat.

The reactive dyestuffs of the formula (I) are distinguished by high reactivity and excellent fixation properties. Owing to their polyfunctionality, they produce high fixation yields even from a long liquor. They are characterized by the fact that the yield is relatively independent of the dyeing temperature, enabling them to be used by the exhaust method at low to medium dyeing temperatures. In the pad-steam method, they require only short steaming times. They produce dyeings of high colour strength having good light and wet fastness properties.

EXAMPLES 58 g of the condensation product of 2,4,6-trichloro-s-triazine with 3-(β-sulphatoethylsulphonyl)aniline and 2,4-diaminobenzenesulphonic acid of the formula

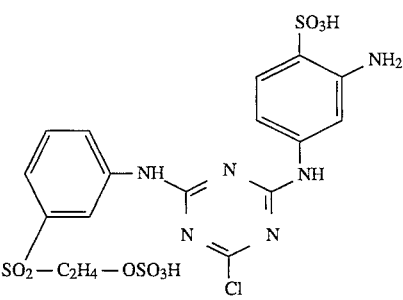

are dissolved in 250 ml of water, 30 ml of concentrated hydrochloric acid are added, and the resulting mixture is diazotized at 0° to 5° C. by addition of 6.9 g of sodium nitrite dissolved in 25 ml of water. The resulting diazonium compound is coupled at pH 7 and 0° to 5° C. onto 50.1 g of the condensation product of 2,4,6-trifluoro-s-triazine with 4-amino-5-hydroxy-2,7-naphthalenedisulphonic acid and morpholine of the formula

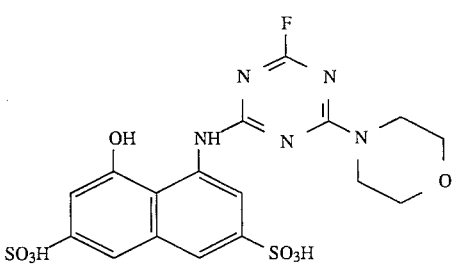

to give the dyestuff of the formula

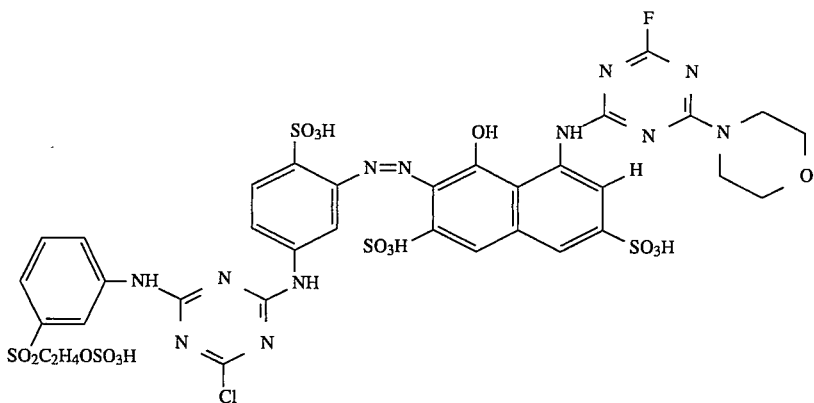

It is isolated by salting out and then dried. It dyes cotton and regenerated cellulose in red hues.

$\lambda_{max}$ (water): 513 nm, 533 nm

If, in order to prepare the diazo component, 2,4,6-dichloro-s-triazine is replaced by an equimolar amount of 2-methoxy-4,6-dichloro-s-triazine, the product obtained is likewise a valuable dyestuff which dyes cotton and regenerated cellulose in red hues.

$\lambda_{max}$ (water): 520 nm, 533 nm

If, in order to prepare the diazo component, 3-(β-sulphatoethylsulphonyl)aniline is replaced by an equimolar amount of 3-(vinylsulphonyl)aniline, the product obtained is likewise a valuable dyestuff which dyes cotton and regenerated cellulose in red hues.

$\lambda_{max}$ (water): 520 nm, 533 nm

I claim:
1. A reactive dyestuff of the formula

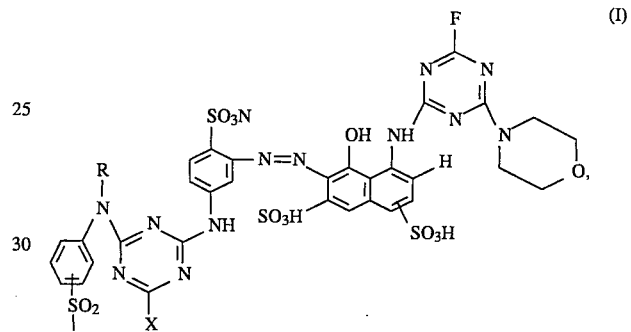

in which
X represents F, Cl or $OCH_3$,
Y represents $CH_2CH_2OSO_3H$, $CH_2CH_2Cl$, $CH_2CH_2OH$ or $CH=CH_2$, and
R denotes hydrogen or $C_1$–$C_4$-alkyl.
2. A reactive dyestuff according to claim 1, of the formula

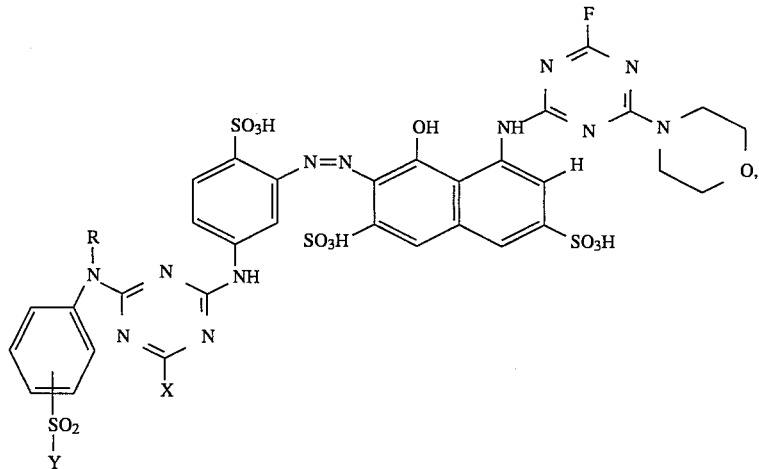

in which
X, Y and R have the meanings given in claim 1.
3. A reactive dyestuff according to claim 2, in which X represents chlorine and Y represents CH₂CH₂OSO₃H or CH=CH₂.

4. A reactive dyestuff according to claim 1, wherein R represents hydrogen or methyl.

5. A reactive dyestuff according to claim 1 of the formula

Y represents CH₂CH₂OSO₃H or CH=CH₂.

7. A reactive dyestuff according to claim 1, wherein Y is CH₂CH₂OSO₃H.

8. A reactive dyestuff according to claim 1, which has the formula

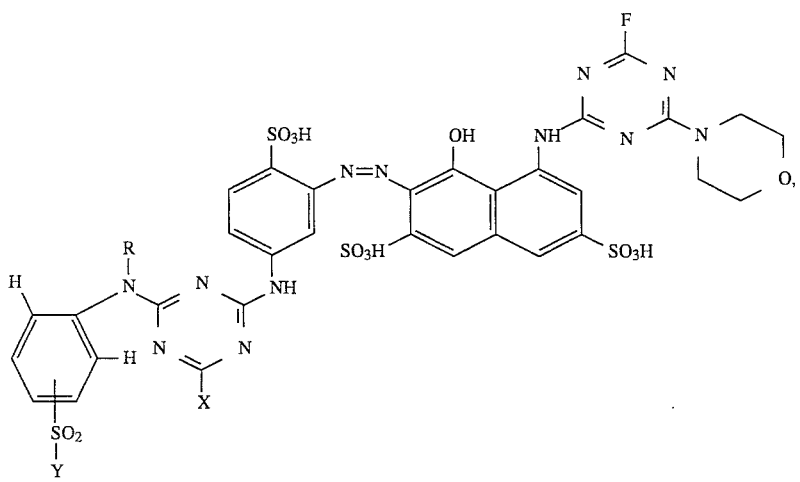

(III)

in which
Y is CH₂CH₂OSO₃H or CH=CH₂, and
R and X have the meanings given in claim 1.

6. A reactive dyestuff according to claim 1 of the formula

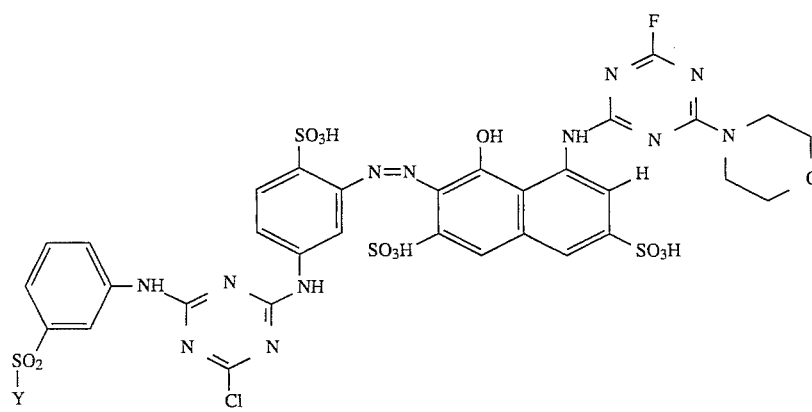

(IV)

in which

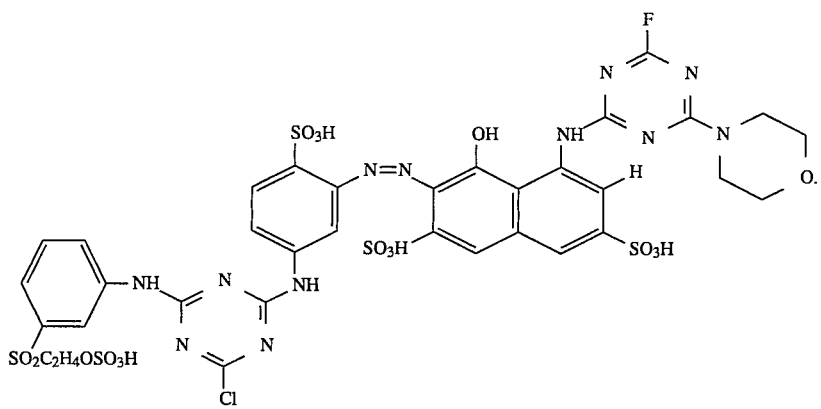
9. A method of dyeing or printing a natural or synthetic hydroxyl- or amido-containing materials which comprises applying a dyestuff according to claim 1 to said materials.
10. Textile products dyed or printed with a dyestuff of the formula (I) according to claim 1.
* * * * *